US006891567B2

(12) United States Patent
Steinberg

(10) Patent No.: US 6,891,567 B2
(45) Date of Patent: May 10, 2005

(54) CAMERA MESSAGING AND ADVERTISEMENT SYSTEM

(75) Inventor: Eran Steinberg, San Francisco, CA (US)

(73) Assignee: Fotonation Holdings, LLC, Peterborough, NH (US)

(*) Notice: Subject to any disclaimer, the term of this patent is extended or adjusted under 35 U.S.C. 154(b) by 0 days.

(21) Appl. No.: 09/313,131

(22) Filed: May 17, 1999

(65) Prior Publication Data

US 2002/0041329 A1 Apr. 11, 2002

Related U.S. Application Data

(63) Continuation-in-part of application No. 09/211,992, filed on Dec. 14, 1998, now abandoned, which is a continuation-in-part of application No. 09/187,706, filed on Nov. 6, 1998, now abandoned, which is a continuation-in-part of application No. 09/105,594, filed on Jun. 26, 1998, now Pat. No. 6,628,325.

(51) Int. Cl.[7] .......................... H04N 5/232; H04N 7/14; H04N 11/00

(52) U.S. Cl. ............................... 348/211.99; 348/14.2; 348/211.1; 348/211.12; 348/211.13; 348/552

(58) Field of Search ........................... 348/211.1, 211.2, 348/14, 211, 14.02, 211.99, 211.12, 211.13, 552; 705/10, 14, 40; 709/219, 217; 455/556, 557; 725/34, 35

(56) References Cited

U.S. PATENT DOCUMENTS

| | | | |
|---|---|---|---|
| 4,148,372 A | | 4/1979 | Schroeder .................... 180/114 |
| 5,003,399 A | * | 3/1991 | Ishimaru et al. ............ 348/361 |
| 5,124,814 A | | 6/1992 | Takahashi et al. .......... 358/906 |

(Continued)

FOREIGN PATENT DOCUMENTS

| | | | |
|---|---|---|---|
| GB | 2289555 | * 11/1995 | .............. G06F/3/00 |

OTHER PUBLICATIONS

Early et al., The VideoPhone 2500—Video Telephony on the Public Switched Telephone Network, 1993, AT&T Technical Journal, pp. 22–32.*

Primary Examiner—Wendy R. Garber
Assistant Examiner—Luong T. Nguyen
(74) Attorney, Agent, or Firm—Sawyer Law Group LLP

(57) ABSTRACT

A digital photography messaging and advertisement system wherein a message center maintains records of camera purchasers, and each corresponding camera identification (ID). The message center prepares and collects messages, putting them in categories including personal messages for a particular camera/user, messages for all users of a particular interest group, and generic messages which can be advertisements for al users with cameras configured according to the system. Each camera is equipped with a transceiver for receiving and sending data, and a display for observing the messages or listening to them. Each camera subscribes to its own personal messages. In addition, a camera user may subscribe to a single or multiple interest groups. When a user turns on the camera, the transceiver transmits a signal conveying the camera identification to the message center. In response, the center packages the messages that are identified for the particular camera/user and transmits them along with a code that assures reception only by the specific camera. Alternatively, the messaging and advertisement center continuously transmits generic and user interest group messages. The camera receives the messages, and places them on a display. Interactive messages remain on the display until the user responds through activation of a key or key sequence on a camera keypad. Alternatively, a key or key sequence is provided whereby a user can select to not receive messages, the activation of the key/sequence directing the camera processor to not initiate the signal transmission to the message center upon camera activation.

18 Claims, 9 Drawing Sheets

U.S. PATENT DOCUMENTS

| | | | |
|---|---|---|---|
| 5,182,635 A | 1/1993 | Nakashima et al. | 358/12 |
| 5,220,366 A | 6/1993 | King | 354/76 |
| 5,392,356 A | 2/1995 | Konno et al. | 380/23 |
| 5,396,546 A | 3/1995 | Remillard | 379/96 |
| 5,444,483 A | 8/1995 | Maeda | 348/231 |
| 5,446,491 A | 8/1995 | Shibata et al. | 348/15 |
| 5,475,441 A | 12/1995 | Parulski et al. | 348/552 |
| 5,477,264 A | 12/1995 | Sarbadhikari et al. | 348/231 |
| 5,477,542 A | 12/1995 | Takahara et al. | 348/14 |
| 5,524,194 A | 6/1996 | Chida et al. | 348/232 |
| 5,550,646 A | 8/1996 | Hassan et al. | 358/442 |
| 5,568,192 A | 10/1996 | Hannah | 348/222 |
| 5,577,107 A | 11/1996 | Inagaki | 379/96 |
| 5,581,613 A | 12/1996 | Nagashima et al. | 380/21 |
| 5,594,319 A | 1/1997 | Thandiwe | 320/2 |
| 5,594,736 A | 1/1997 | Tatsumi et al. | 348/232 |
| 5,606,361 A * | 2/1997 | Davidsohn et al. | 348/14 |
| 5,606,365 A * | 2/1997 | Maurinus et al. | 348/552 |
| 5,625,410 A | 4/1997 | Washino et al. | 348/552 |
| 5,633,678 A | 5/1997 | Parulski et al. | 348/232 |
| 5,650,861 A | 7/1997 | Nakajima et al. | 358/433 |
| 5,674,003 A | 10/1997 | Andersen et al. | 364/514 |
| 5,696,850 A | 12/1997 | Parulski et al. | 348/232 |
| 5,708,856 A | 1/1998 | Cloutier | 396/6 |
| 5,754,227 A | 5/1998 | Fukuoka | 348/232 |
| 5,814,798 A | 9/1998 | Zancho | 235/380 |
| 5,825,408 A * | 10/1998 | Yuyama et al. | 348/14 |
| 5,835,140 A | 11/1998 | Nakamura et al. | 348/211 |
| 5,852,472 A | 12/1998 | Prasad et al. | 348/552 |
| 5,862,217 A | 1/1999 | Steinberg et al. | 348/231 |
| 5,862,218 A | 1/1999 | Steinberg | 348/231 |
| 5,862,325 A | 1/1999 | Reed et al. | 395/200.31 |
| 5,880,770 A * | 3/1999 | Ilcisin et al. | 348/14 |
| 5,893,037 A * | 4/1999 | Reele et al. | 348/14.02 |
| 5,896,128 A | 4/1999 | Boyer | 348/15 |
| 5,905,528 A | 5/1999 | Kodama | 348/231 |
| 5,943,046 A | 8/1999 | Cave et al. | 348/552 |
| 6,002,770 A | 12/1999 | Tomko et al. | 380/44 |
| 6,046,762 A | 4/2000 | Sonesh et al. | 348/16 |
| 6,049,621 A | 4/2000 | Jain et al. | 382/125 |
| 6,073,192 A | 6/2000 | Clapp et al. | 348/552 |
| 6,161,122 A * | 12/2000 | Hawkes | 709/203 |
| 6,266,082 B1 | 7/2001 | Yonezawa et al. | 348/14.02 |
| 6,351,745 B1 * | 2/2002 | Itakura et al. | 709/217 |
| 2001/0010543 A1 | 8/2001 | Ward et al. | 348/207 |

* cited by examiner

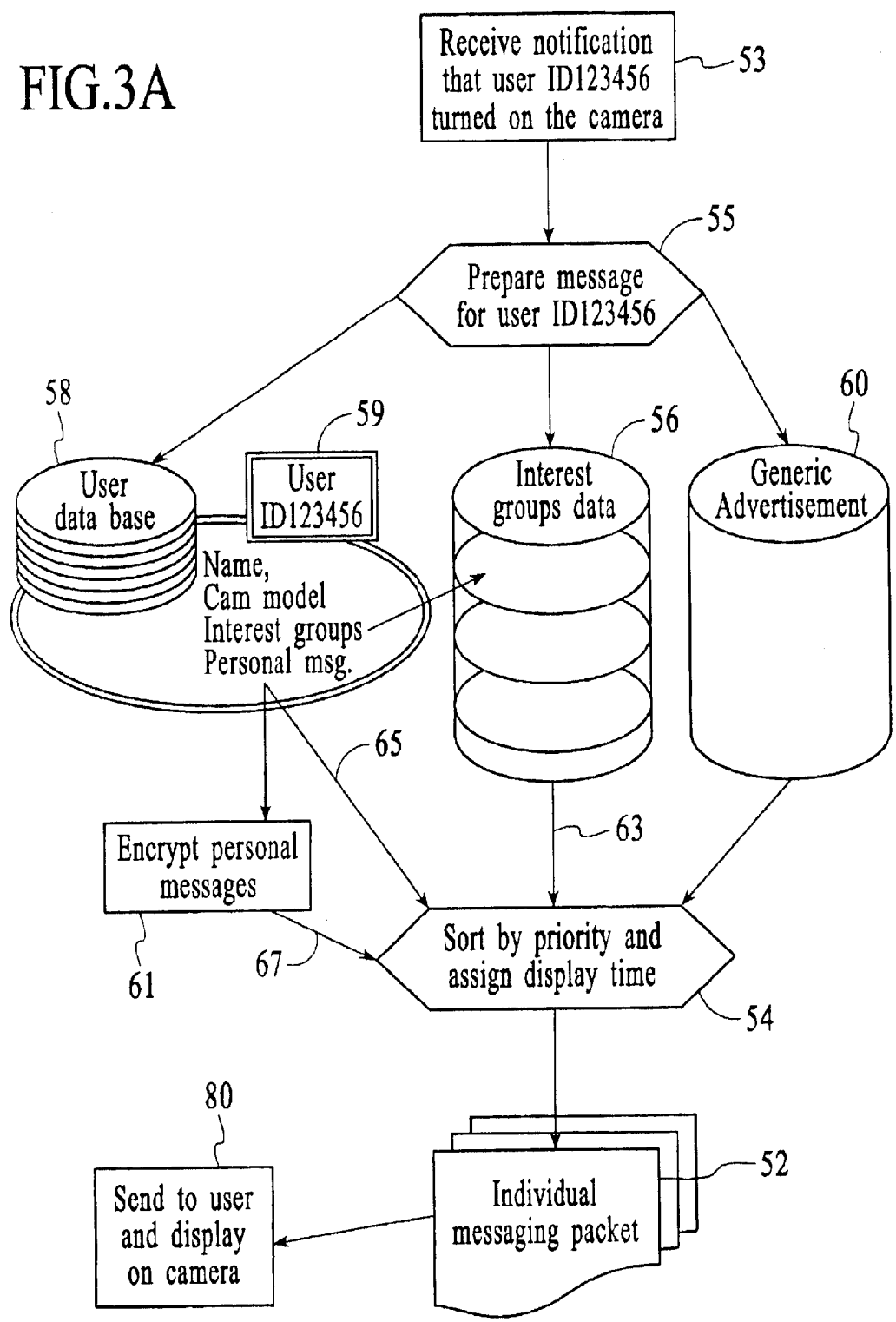

SUBSCRIBE NOW FOR A SPECIAL OFFER

We will print 20 images from your camera

FREE

Please send details   Y, N

FIG.4

Mr. Doe:

Your prints are ready for pick-up at

Photo Store
123 Camera Way
Goodview, CA 65431

FIG.5

CAMERA MESSAGING AND ADVERTISEMENT SYSTEM

This is a Continuation-in-Part of application Ser. No. 09/105,594 filed Jun. 26, 1998 now U.S. Pat. No. 6,628,325, a Continuation-in-Part of application Ser. No. 09/187,706 filed Nov. 6, 1998 now ABN, and a Continuation-in-Part of application Ser. No. 09/211,992 filed Dec. 14, 1998 now ABN.

BACKGROUND OF THE INVENTION

1. Field of the Invention

The present invention relates generally to digital still and video cameras, and more particularly to a digital camera system wherein personal, camera model related and generic messages are compiled and transmitted by a message center and received by and displayed on a digital camera. This invention is related to the inventions disclosed in U.S. patent application Ser. Nos. 09/105,594, filed Jun. 26, 1998; 09/187,706 filed Nov. 6, 1998; and 09/211,992, filed Dec. 14, 1998, the disclosures of which are incorporated herein by reference.

2. Brief Description of the Prior Art

Traditionally, when cameras are sold by a retailer to a customer, it is a one-time transaction. There is normally very little opportunity for the camera vendor, the retailer, or the manufacturer or a digital camera service center, etc. to promote an on-going business relationship with the particular customer. Although cameras are known that can send and receive messages, they do not provide for an on-going business relationship. A camera with message capability is described in U.S. Pat. No. 5,220,366 that can receive and display messages and transmit acknowledgment to the sender. In this patent, the goal is to minimize the number of devices a photographer needs to carry with him by integrating a photographer's pager with the camera. The pager in this patent is not configured to be directly relevant to the actual operation of the camera, or for enhancement of communication between a customer and the manufacturer, retailer, service center, etc. Currently, camera warranty records are kept by vendors and can be used to identify purchases for the purpose of sending upgrade information, etc., but statistically a high percentage of purchasers do not fill out and return their warranty registration forms. Furthermore, a manufacturer's method of contacting purchasers from warranty registrations is normally through mailed advertisements, and because of the large quantity of so called junk mail, it is common for such items to be discarded without review.

In view of the above, it is apparent that a need exists for a method by which the vendor, manufacturer, retailer, service center, etc. can leverage on the ability of a digital camera to display alphanumeric and graphical messages on a camera display. Although most digital cameras are equipped with the capability of displaying data, it is limited to information and data already programmed into the camera at the time of manufacture, and does not enhance vendor to customer communication.

SUMMARY

It is therefore an object of the present invention to provide a system for maintaining communication between a seller of camera related merchandise or services, or a billing center and a camera user.

It is a further object of the present invention to provide a system wherein a manufacturer or retailer can advertise camera upgrades and new models to individuals who have purchased a camera.

It is a still further object of the present invention to provide a system wherein the advertisement can be in visual or audio form.

It is a still further object of the present invention to provide a system wherein a direct content advertisement can be sent to camera users based on their usability habits.

It is a still further object of the present invention to provide a system wherein a personal content advertisement can be sent to camera users based on additional data from the user such as from questionnaires etc.

It is a still further object of the present invention to provide a system wherein a generic advertisement can be sent to camera users based on their usability habits.

It is a still further object of the present invention to enable ongoing advertisement in the form similar to banners on the camera display.

It is a still further object of the present invention to enable an interactive response by the camera user to such messages.

Briefly, a preferred embodiment of the present invention includes a system wherein a message center maintains records of camera purchasers, and each corresponding camera identification (ID). The message center prepares and collects messages, putting them in categories including personal messages for a particular camera/user, groupwise messages for all users of a particular category such as camera model, shooting habits, other interests, etc., and generic messages which can be advertisements for all users with cameras configured according to the system. Each camera is equipped with a transceiver for receiving and sending data, and a visual display for observing the messages. Alternatively, the communication to the user can be achieved by means of an audio signal such as from a speaker built into the camera. When a user turns on the camera, the transceiver transmits a signal conveying the camera identification to the message center. In response, the center packages the messages that are identified for the particular camera/user and transmits them along with a code that assures reception of personal message portions only by the specific camera. In addition, such personal communication may also be encrypted. The camera receives the messages, and places them on a display based on a predefined priority. Interactive messages remain on the display until the user responds through activation of a key or key sequence on a camera keypad. Alternatively, a key or key sequence is provided whereby a user can select to not receive messages, the activation of the key/sequence directing the camera processor to not initiate the signal transmission to the message center upon camera activation.

An advantage of the present invention is that it provides a camera vendor or retailer the ability to promote photo related advertisements such as related photographic services, upgrades and new models.

A further advantage of the present invention is that it can send a custom message relevant to a single camera user, and/or generic messages to users of cameras with a particular classification or interest category, and/or to all users.

A still further advantage of the present invention is that advertisements can be sent to a camera with a greater probability of being received and processed by the camera user than an advertisement sent by other non-direct messaging systems such as mail, to be received most often with numerous other junk mail items.

A still further advantage of the present invention is that messaging received by the camera can be interactively responded to by the cameras user, providing an immediate and convenient mechanism to respond to messages.

A still further advantage of the present invention is that the system can provide an additional income category for the camera vendors, in the form of direct advertisement.

A still further advantage of the present invention is that camera users can stay well informed as to services and improvements related to their camera.

IN THE DRAWING

FIG. 3A is a flow chart of preparation of user based message packets by the message center;

FIG. 4 shows an example of a generic message;

FIG. 5 shows an example of a personal message;

DETAILED DESCRIPTION OF THE PREFERRED EMBODIMENT

Figure 1:
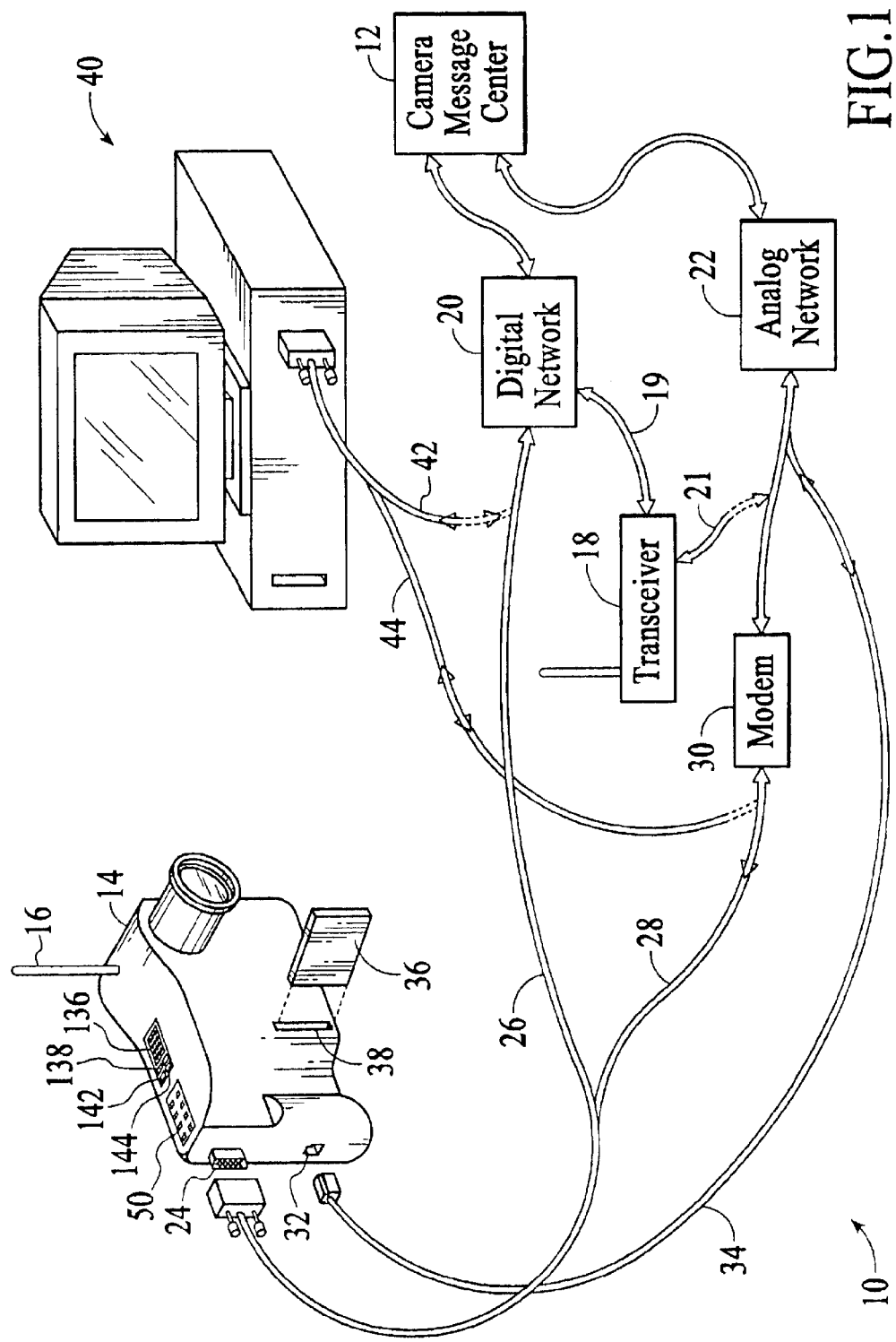
FIG. 1 is an illustration of the system of the present invention.

Referring now to FIG. 1 of the drawing, a preferred embodiment of the system 10 of the present invention is illustrated, including a message center 12, a digital camera 14 and various ways of communication between the center 12 and camera 14. The preferred mode of communication is through a radio frequency connection, facilitated in the camera by a transceiver as evidenced by antenna 16. Transmission can be through a cellular telephone type of system, or it can be a dedicated radio frequency network, to a network transceiver 18 making connection through lines 19 and 21 to a communication network which can be either digital 20 or analog 22. Transmission to the message center also occurs if the camera is connected to the network through a cable connection. For example, a direct digital connection is made through connector 24 and cable 26 to the digital network 20. Connection can alternatively be made from the digital connector 24 to analog network 22 through cable 28 and modem 30. Instead of the external modem 30, the camera can include an internal modem with an analog output 32 for connection to a cable 34 to the analog network 22. A programmable card 36 can also be used, interfacing with the camera through slot 38. The card can receive data from the network through a computer 40 connected to the network by cables 42 or 44.

Figure 2:
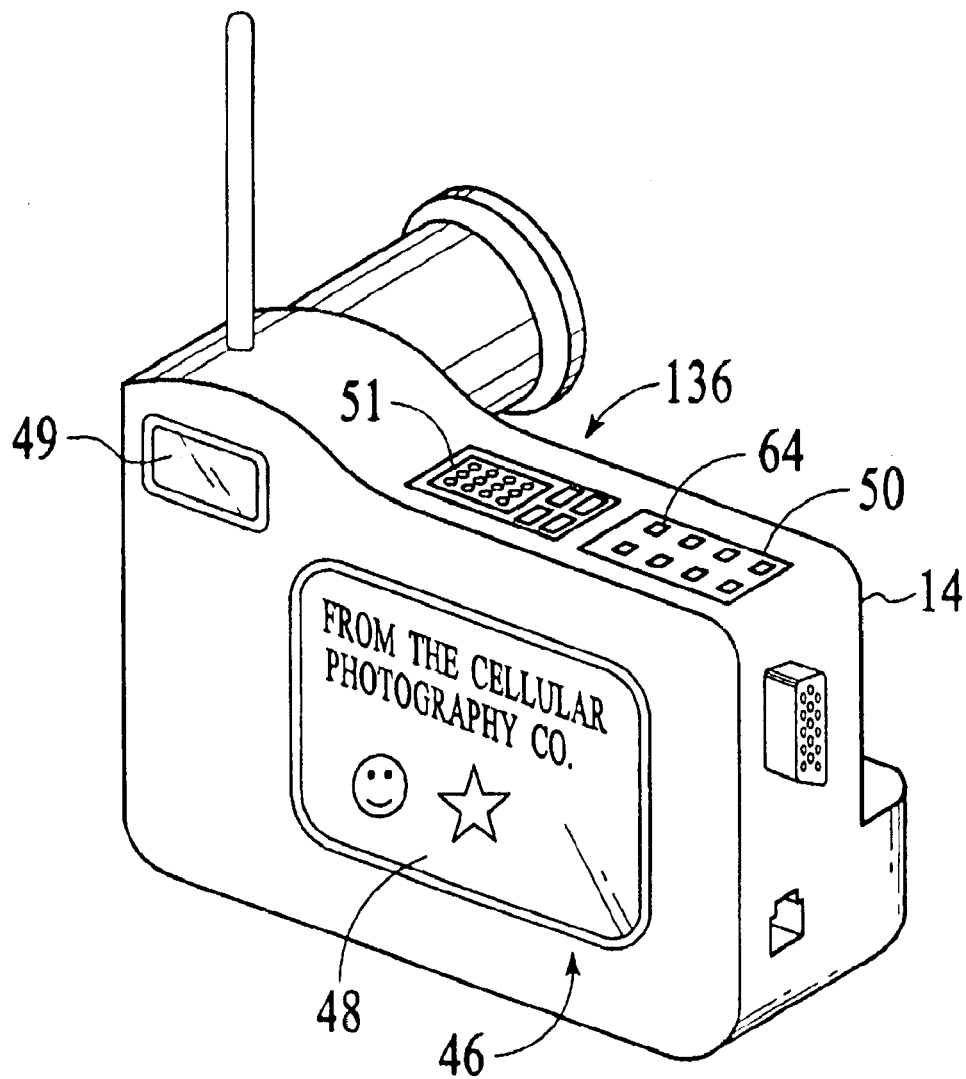
FIG. 2 shows the LCD display on the back side of the digital camera.

FIG. 2 shows the back 46 of the camera 14 with an LCD display screen 48 for reviewing messages from the center 12. The messages of the present embodiment sent by the message center are generally related but not essential to the camera operation, and are better described as informative advertisements and peripheral camera business.

Although the LCD display screen 48 is shown as a preferred embodiment, the spirit of the present invention also includes other apparatus for displaying a message that will be apparent to those skilled in the art. For example, the messages can also be displayed inside a camera view finder 49, or on another separate message screen such as at area 51. The display of a message can occupy either the whole screen, or a portion of it, also referred to as a banner message. For example, in the screen 48 as shown in FIG. 2, a message could be limited to the area occupied by the two lines of text displayed. The area can be a dedicated area for display of messages.

Although the visual display is shown as a preferred embodiment, the spirit of the present invention also include other apparatus for conveying messages that will be apparent to those skilled in the art. For example, the message can be played to the used via an audio speaker 45.

In operation of the system 10, the message center 12 prepares and collects messages and sorts them into categories including personal messages for a particular camera/user, messages for all users of a particular category, and generic messages for all users of cameras configured according to the system 10. When a user turns on the camera 14, the camera automatically transmits a signal to transceiver 18 for conveying the camera identification to the message center 12. In response, the center 12 transmits back to the camera any messages that are identified/sorted for the particular camera/user. In the case of a generic message or messages to generic categories, such as all users of a specific camera model, the message center may continuously transmit messages without waiting for a camera to identify itself.

Messages that are specific to a particular category, or only for a particular camera/user, are sent with an identification code corresponding only to that particular camera. In addition, personal messages to a particular user may be encrypted, or otherwise secured. The camera according to the present invention will only receive and store in memory those messages that include the proper matching message codes. For example, all cameras configured according to the system of the present invention will respond to a code for generic messages. A separate code must be included for model based messages, and each camera has its own distinct code that must be transmitted with those messages intended for only a specific camera.

Other categories may include professional photographers, wild life photographers, etc. A single camera may subscribe to more than one category. The subscription process may be initiated by the camera user or by the message center. For example, a user may choose the categories which he is interested in by going through an interactive selection mechanism on the camera via a yes/no list on the LCD or as played on the camera's audio system. In a different scenario, the user may subscribe to such categories by filling a questionnaire at the time of purchase or when filling in a warranty card. In a different scenario, an intelligent advertisement center may build a user profile based on other information such as the quantity of images taken by a camera, the type of images etc., in order to determine a possible class of interest.

An alternative embodiment of the system includes the camera 14 with a user selection on pad 50 whereby the user can choose to receive or not receive messages. A further alternative includes selection by a user to receive only one or more types of messages, such as only personal messages, or only personal and interest group based messages, etc. A further alternate embodiment of the system includes the message center 12 continuously transmitting generic messages as mentioned above for all cameras, and/or continuously transmitting interest group messages and/or personal messages along with the particular codes required for reception of the messages by a particular camera.

The camera 14 receives the messages, stores them in RAM (FIG. 7), and puts them on the display 48, or other messaging mechanism such as an audio speaker 45 as provided in an order according to a priority assigned by the message center. Interactive messages remain on the display 48 until the user responds, preferably through activation of a key or key sequence on the camera keypad 50. Alternatively the keypad 50 can be implemented as virtual keys by implementing the LCD screen 48 as a touch screen. As part of the preferred embodiment, or as an alternative feature, a key or key sequence is provided allowing a user the option of avoiding the reception of messages by activating the key or key sequence on the keypad 50. In response to the key sequence, the camera processor preferably refrains from initiating the transmission of a signal notifying the message center that the camera is activated. Other methods of deactivating the message system will be apparent to those skilled in the art, and these are included in the spirit of the present invention. For example, a switch or key sequence can be provided that deactivates the transceiver by cutting off its power source, etc. This latter approach is preferably provided in the camera, according to the system requirements when the alternate embodiment is implemented wherein the center continuously transmits messages.

FIG. 3A illustrates the process of preparing a message packet for a particular camera. When the message center receives a notification 53 that a specific camera is being turned on, or alternatively ready to receive new messages, the center issues commands 55 to the databases to prepare a packet. FIG. 3A shows three databases, including a user's database 58 containing user specific information such as the user's name, address, ID 59, camera model, and the user's special interests. In addition, the user database 58 can include personal messages that are directed to a particular user, such as a notice of expiration of a warranty, service contract, etc. An interest group message in database group 56 could be for a specific camera model group messages such as a recall notice, tips on how to use a camera upgrade for the particular model, or special operating instructions. The generic message database could include new product advertisements and other generic messages. Messages in the generic database (60) can be advertisements that are only remotely related to the cameras themselves. For example, such advertisements can promote a specific brand of batteries, a special offer on printing services etc.

In operation, sending database 58 the user ID would cause the particular users interest group data to be sent to the interest group database 56. The database 56 responds by outputting 63 the corresponding stored messages. The user's database 58 outputs the personal messages, either directly 65, or to an encryption routine 61, which then outputs 67 encrypted personal messages. The generic messages, interest group messages and personal messages are then each assigned a priority and display time 54, packaged 52, and sent and displayed 80 on the user's camera.

Figure 3B:
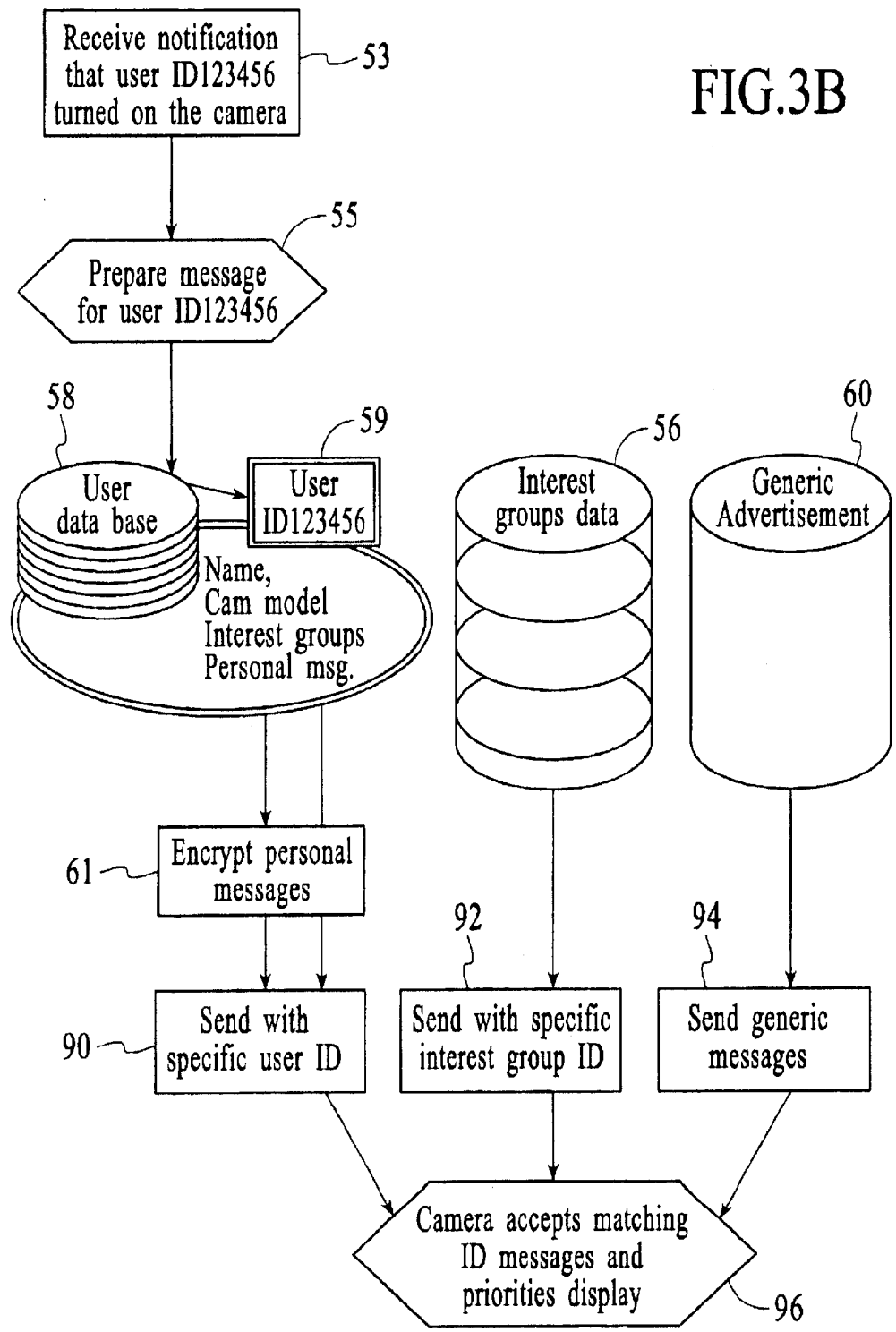
FIG. 3B is a flow chart of preparation of multiple classification message packets by the message center.

FIG. 3B describes an alternative advertisement system in which the advertisement system sends generic messages (block 94) as well as messages associated with special interest groups (block 92) on a continuous or periodic basis, either random or scheduled, without the center having received a signal from a camera that it has been turned on. Messages for specific individual users are only sent by request (block 90), i.e. when the center receives a signal indicating that a camera has been turned on. In the system illustrated in FIG. 3, the camera preferably has the role of deciding whether to accept a message or not, as well as the role of prioritizing the camera display (block 96).

Figure 3C:
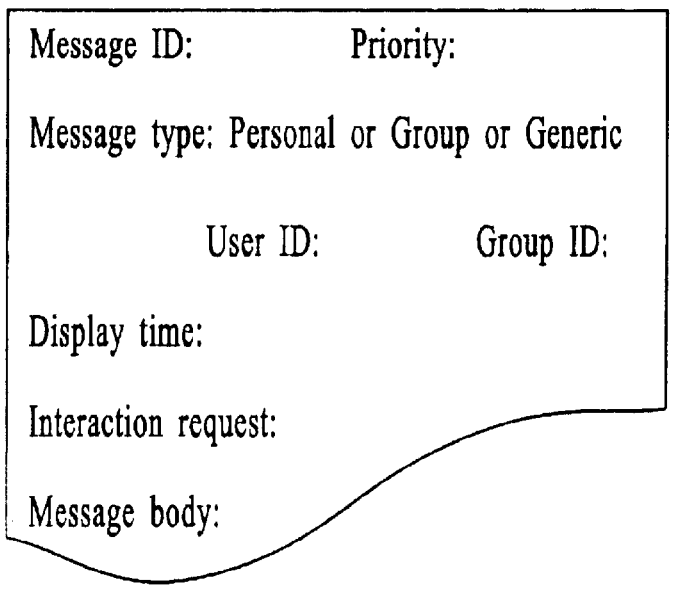
FIG. 3C illustrates a possible single message structure.

FIG. 3C illustrates an example of a possible single message structure. Each message has an identification number. In addition, the message type is indicated for determining the distribution of the message, whether it is a personal message, an interest group message, or a generic message. Other parameters include message priority, and the body or i.e. content of the message. The message body can be in a known file format, such as display language HTML, or alternatively in a proprietary graphic or textual format.

Figure 3D:
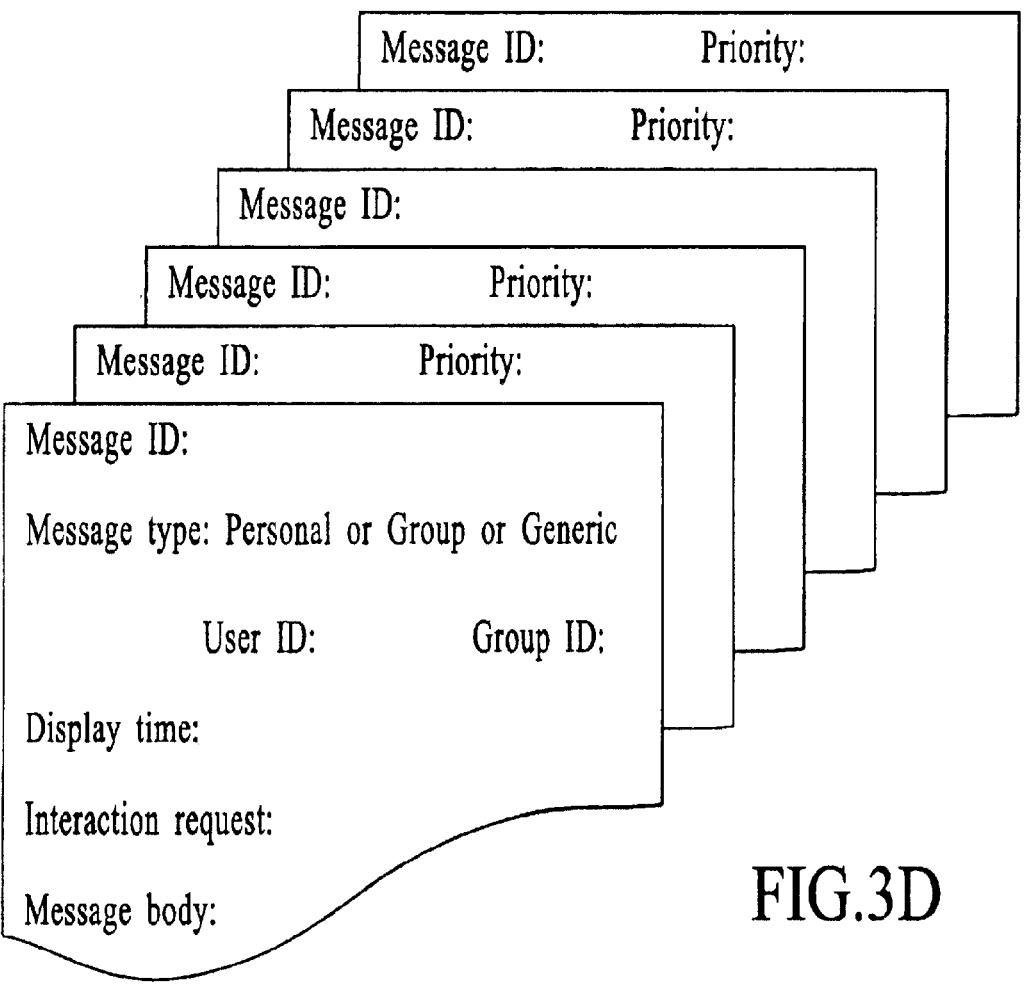
FIG. 3D illustrates a packet generated from multiple messages.

FIG. 3D illustrates a packet generated from multiple messages such as described in FIG. 3C.

FIG. 4 illustrates a generic type of message for an advertisement. The messages can be displayed on a portion of the screen as a banner, or they can occupy the entire screen. In the case of an interactive message, the user may be asked to reply. As an alternative, messages that will not be replied to may have a default reply that is activated after a predefined length of idle time. Naturally, such advertisements can be not only alphanumeric, but graphical depending on the display category.

FIG. 5 illustrates a personal message notifying a camera user that prints are ready for pickup. As before, the user may be prompted for a reply.

Figure 6A:
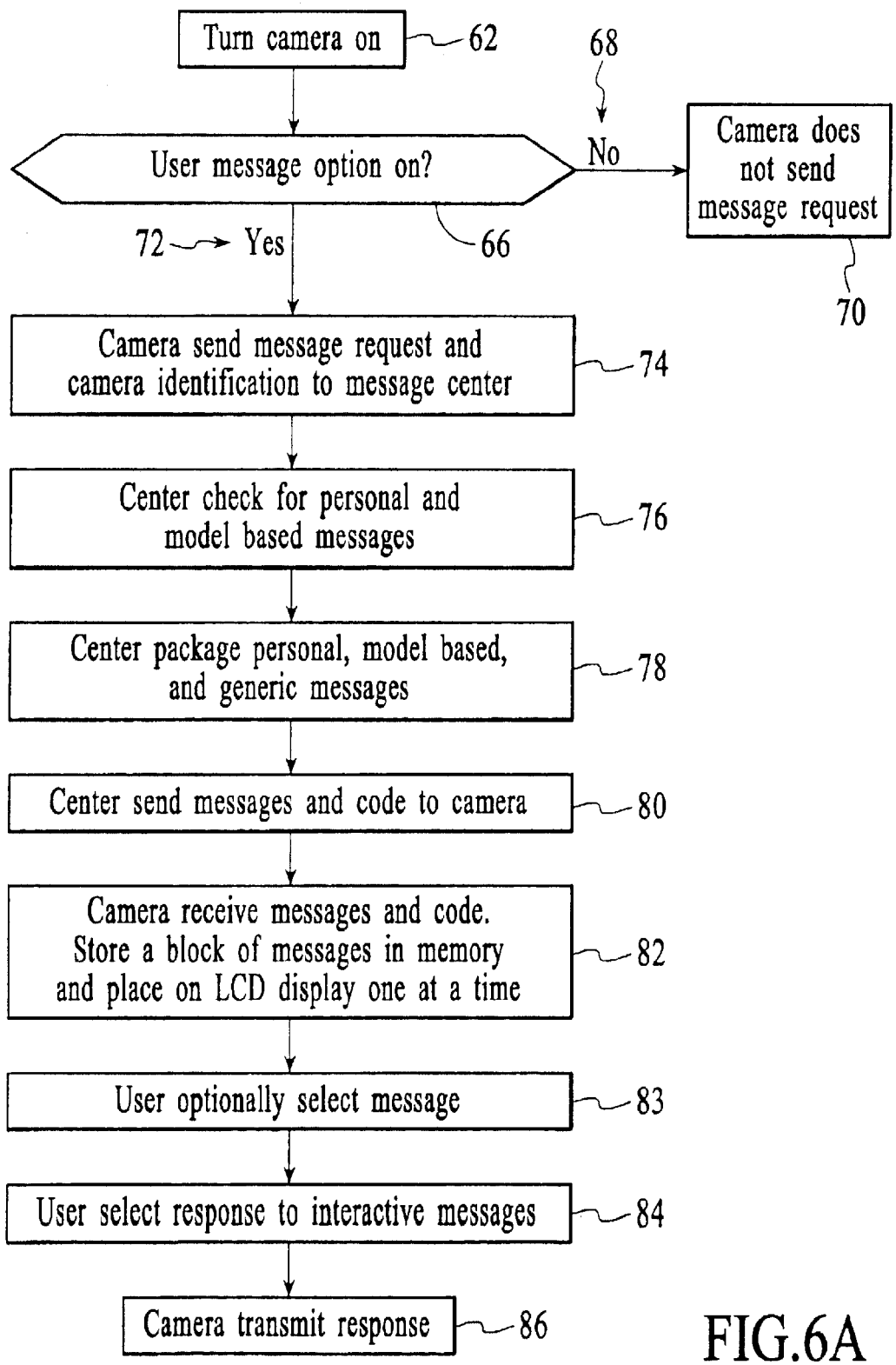
FIG. 6A is a flow chart providing further detail of a preferred embodiment of the present invention.

Referring now to FIG. 6A, the method of the preferred embodiment is illustrated in more detail in a flow chart. The method of FIG. 6A assumes and includes the process of FIG. 3A or a similar procedure where the message center has prepared messages waiting for transmission to a camera. The next step, as shown in FIG. 6A is a user starting/turning on a camera (block 62). The camera 14 (FIG. 2) optionally includes a key 64 (FIG. 2) or a key sequence by which the user may select to receive or not receive the messages as explained above. This option is indicated by block 66 in FIG. 6A. If the user selects to not receive messages 68, a preferred embodiment has the camera not transmitting a message request signal (block 70). Alternatively, or in addition a key sequence is provided whereby a user can select to not receive any messages transmitted from the message center. This latter approach is preferred if the message center is continuously transmitting. If the user selects to receive messages 72, the camera transmits a message request signal to the message center 12 (block 74). The message request signal includes information identifying the camera. It also may include a camera access code that must be transmitted by the message center in order for the particular camera to receive the message. Optionally, the message center may already have the access code for each camera serial number, and in that case the camera only needs to transmit enough information to identify itself.

Upon receipt of the request signal from the camera, the message center 12 collects any personal messages and any messages for the particular model camera (block 76). The center 12 then adds selected generic messages and puts them in an order, assigning the necessary order/priority (block 78). These messages are then "packaged" and sent/transmitted to the camera (block 80). The camera receives a block of messages and stores them in memory. Each message is then separately placed on the LCD display 48 (block 82) according to the priority assigned by the message center. Each message remains on the display for a prescribed time according to the priority data. Alternatively, each message can remain on the display until the user activates a key, for example on the keypad 50. As a further option, the camera includes a key allowing a user to move forward or backward (toggle) in the message list to find a particular message. (block 83). The user can also select to delete a particular message from memory. The preferred method of display is sequential, with each message displayed in the order assigned according to a priority sent by the message center. The user can select (toggle) to have each message displayed until a key is activated to display the next message. A second key can be used to move backwards in the list of messages to view a message previously displayed. Alternatively, the user can select to have the camera automatically display the messages, one at a time in the order assigned, with each message displayed for a set time interval and then automatically displaying the next message, etc. These options are indicated by block 83. In the case of any interactive messages such as the one illustrated in FIG. 4, the user must respond by pressing the required key on the keypad 50, which is Y or N in FIG. 4 (block 84). The camera then transmits the answer/selection (block 86).

Figure 6B:
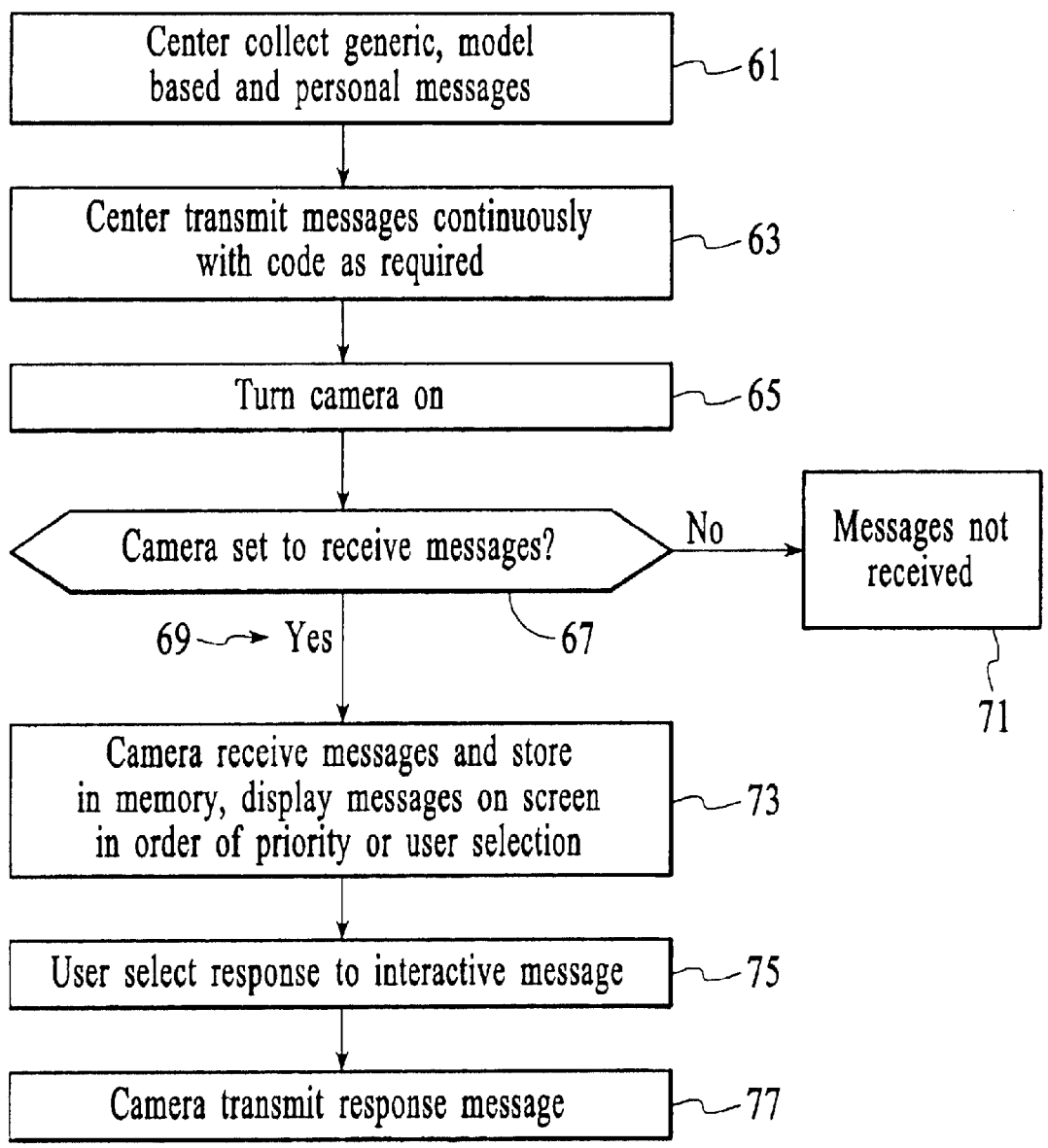
FIG. 6B is a flow chart of an alternate embodiment.

FIG. 6B illustrates an alternate embodiment, as described above based on the packets as described in FIG. 3B, wherein the center continuously transmits messages. The message center collects generic messages, model based messages, and personal messages and assigns the camera access codes to the model and personal based messages for the corresponding cameras (block 61). The center then transmits the messages and required codes continuously (block 63). In order for the camera to receive a message, the user first turns the camera on (block 65), and then selects (block 67) to either receive 69 or not receive 71 messages. Upon receiving and displaying a message (block 73), the user will need to respond if the message is interactive (block 75). The response is then transmitted by the camera to the message center (block 77).

Figure 7:
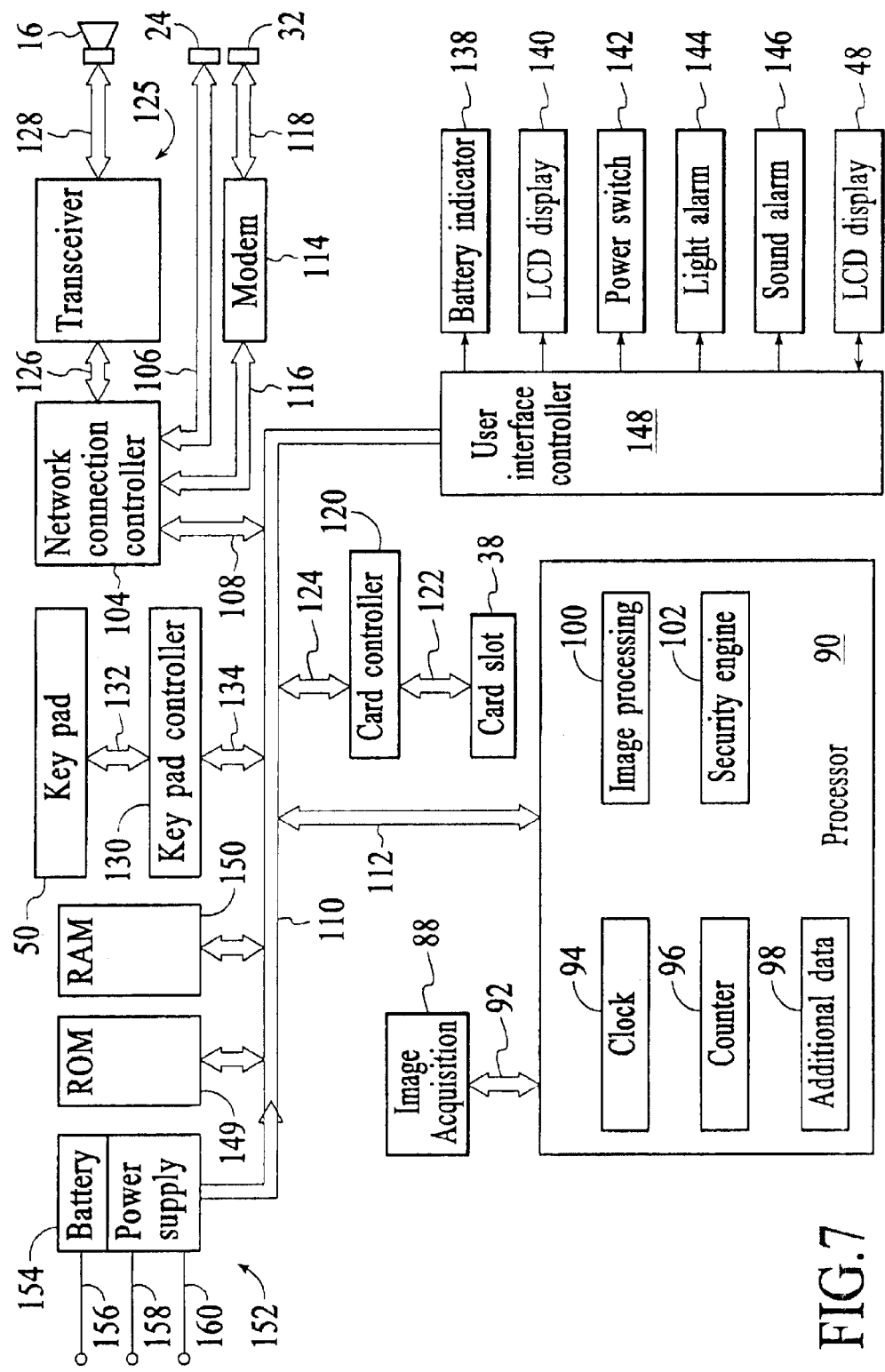
FIG. 7 is a detailed block diagram of the digital camera.

FIG. 7 is a detailed block diagram of the digital camera 14, including a modification of the integrated communications device and digital camera shown in FIG. 9 of U.S. Pat. Ser. No. 09/105,594, the disclosure of which is included in the present specification by reference. For a detailed disclosure of various alternative network connections, reference is made to the relevant figures of Ser. No. 09/105,594 . Referring now to FIG. 7, the camera 14 includes a camera digital image acquisition apparatus 88 in communication with a processor 90 through bus 90. The processor 90 includes a clock 94, a counter 96, storage for additional data 98, image processing capability 100 and a security engine 102. The connector 24 provides interface with the processor 90 through network connection controller 104 by way of bus lines 106, 108, 110 and 112. Alternatively, or in addition, the camera has a built-in modem 114 interfacing with the controller 104 via bus 116, and to a communications network through connector 32 via bus 118. The smart card 36 of FIG. 1 interfaces through the card slot 38 with the processor 90 by way of card controller 120 via buses 122, 124, 110 and 112. The transceiver 125 is shown for RF communication, interconnected with the network controller 104 via bus 126, and including the antenna 16 connected via bus 128. The keypad 50 is interfaced with the processor 90 by a keypad controller 130 via buses 132, 134, 110 and 112.

Numerous user interface items are shown in FIG. 7, included generally in the user interface area 136 of FIG. 1 or at other locations as desired, including a battery indicator 138 and LCD display 140, a power switch 142, light alarm 144, and sound alarm 146. These are all interfaced with the various relevant component blocks of FIG. 7 by a user interface controller 148. The LCD display 140 (FIG. 2) for purposes of the present disclosure includes facility for any of various items that may be useful to communicate camera related matters to the user. These include a count of the number of images taken, and indication of low battery power. The light 144 and sound alarm 146 are used with or without accompanying messages indicated by the LCD display 140. For example, the alarm may indicate low battery power. LCD display 48, located preferably on the camera back, as shown in FIG. 2, also receives data from the processor through controller 148. It displays messages from the message center, but can alternatively be used to display the camera related items described as displayed on display 140. Also indicated in FIG. 7 are the necessary memory units, including a ROM 149 and RAM 150 and a power supply 152 with options, including a battery 154, an AC battery charging supply input 156, a phone line power connection 158 and a line 160 from an alternate power bus, not shown.

In operation, activation of power switch 142 turns the camera on, causing the processor 90 to send the camera identification to the message center 12 by activating the transceiver 125 for sending a corresponding camera ID code. The processor may also send an access code that must be indicated in data sent to the camera in order for the data to be received. This code does not have to be sent if the center 12 already has the code for each camera.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

It is claimed that:

1. An integrated digital camera apparatus comprising:
   (a) a housing;
   (b) a digital image acquisition apparatus built into said housing, said digital image acquisition apparatus including image capture apparatus for converting a light image to digital image data and image storage apparatus for storing said digital image data;
   (c) a messaging apparatus independent of said digital image acquisition apparatus built into said housing, said messaging apparatus including
      (i) transceiver apparatus limited to sending and receiving messages through a communications network, said messages not including digital image data from said digital image acquisition apparatus;
      (ii) automatic signal transmission apparatus for automatically causing said transceiver apparatus to transmit a message request signal to said messaging apparatus conveying an identification of said camera apparatus when said transceiver is turned on;
      (iii) code apparatus for selectively receiving messages sent to said transceiver by a message center from a service provider, wherein said messages include advertisements and at least one of warranty registration forms and questionnaires, and wherein said service provider includes any combination of a billing center, a retailer, and a camera manufacturer; and
      (iv) message display apparatus for communicating said messages to a user of said camera apparatus in graphic or audio form; whereby said messaging apparatus in said camera apparatus and said message center allows said service provider to promote an ongoing business relationship with said user after sale of said camera apparatus.

2. A digital camera apparatus as recited a claim 1 further comprising user activated apparatus for causing said transceiver to transmit a message request signal to said message center conveying an identification of said camera.

3. A digital camera apparatus as recited a claim 1 further comprising apparatus disabling said automatic signal transmission apparatus when a user does not want to receive messages.

4. A digital camera apparatus as recited in claim 1 wherein said code apparatus includes identification of a model number of said camera.

5. A digital camera apparatus as recited in claim 1 further interactive message response apparatus for responding to question received in a message from said message center.

6. A digital camera message system comprising:
   (a) a message center including
      (i) apparatus for collecting, preparing and sorting messages to be sent to a transceiver in an assembly including a digital camera, wherein said messages include advertisements and at least one of warranty registration forms and questionnaires from a service provider, wherein said service provider includes any combination of a billing center, a retailer, and a camera manufacturer;
      (ii) first communication apparatus responsive to reception of a message request signal conveying a camera identification for transmitting said messages to said transceiver along with a code; and
   (b) an integrated hand held assembly including
      (i) a housing;
      (ii) a digital image acquisition apparatus built into said housing, said digital image acquisition apparatus including image capture apparatus for converting a light image to digital image data and image storage apparatus for storing said digital image data;
      (iii) transceiver apparatus limited to sending and receiving messages through a communications network, said messages not including digital image data from said digital image acquisition apparatus;
      (iv) code apparatus including apparatus responsive to said code for selectively processing messages sent to said camera;
      (v) automatic signal transmission apparatus for automatically causing said transceiver apparatus to transmit a message request to said message center conveying an identification of said integrated hand held assembly when said transceiver apparatus is turned on; and
      (vi) message display apparatus for communicating said messages to a user of said integrated hand held assembly in graphic or audio form;
         whereby said message center allows said service provider to promote an ongoing business relationship with said user after sale of said integrated hand held assembly.

7. A digital camera message system as recited in claim 6 wherein said message center includes a capability to send a selected message to a specific said assembly based on said code.

8. A digital camera message system as recited in claim 6 wherein said message center further includes a capability to send a message simultaneously to a plurality of assemblies by transmitting a corresponding particular said code.

9. A digital camera message system as recited in claim 6 wherein said message center further includes a capability to prioritize messages as part of a single packet of multiple said messages.

10. A digital camera message system as recited in claim 6 wherein said assembly further includes means for disabling said automatic signal transmission apparatus when a user does not want to receive messages.

11. A digital camera system as recited in claim 6 wherein said assembly further includes interactive message response apparatus for responding to a question received in a message from said message center.

12. A method for maintaining communication between a camera-related service provider and a camera user after sale of the camera, the method comprising the steps of:
   providing a message center for:
      maintaining records of camera users and corresponding camera identification (ID),
      storing messages that include advertisements and at least one of warranty registration forms and questionnaires, and
      grouping the messages into categories based on individual users and categories of users; and
   transmitting from said message center to the camera, messages that match the categories associated with the user, such that the messages are communicated to the user of the camera in graphical or audio form, thereby providing the service provider with an opportunity to promote an ongoing business relationship with the user.

13. The method of claim 12 wherein the message center transmits the messages to the camera in response to receiving the camera ID from the camera.

14. The method of claim 13 wherein the message center transmits each message with an ID code, and wherein the camera receives and stores only the messages having an ID code that corresponds to the camera.

15. The method of claim 14 wherein the user can subscribe with the message center to receive messages for selected categories.

16. The method of claim 14 wherein the user may select an option from the camera not to receive any messages.

17. The method of claim 12 wherein the message center continuously transmits generic messages to a plurality of cameras.

18. The method of claim 12 wherein the message center packages personal messages for the user and for a particular camera model together with generic messages, and transmits the package to the camera.

* * * * *

UNITED STATES PATENT AND TRADEMARK OFFICE
CERTIFICATE OF CORRECTION

PATENT NO. : 6,891,567 B2  Page 1 of 1
APPLICATION NO. : 09/313131
DATED : May 10, 2005
INVENTOR(S) : Eran Steinberg It is certified that error appears in the above-identified patent and that said Letters Patent is hereby corrected as shown below:

In the Claims:

Column 9, line 8, after, "further" insert --comprising--

Signed and Sealed this

Eighteenth Day of November, 2008

JON W. DUDAS
*Director of the United States Patent and Trademark Office*